(12) United States Patent
Milano, Jr.

(10) Patent No.: US 6,640,664 B2
(45) Date of Patent: Nov. 4, 2003

(54) POWER ASSEMBLY AND METHOD OF MAKING SAME

(75) Inventor: Arthur J. Milano, Jr., Burlington, CT (US)

(73) Assignee: Seitz Corporation, Torrington, CT (US)

( * ) Notice: Subject to any disclaimer, the term of this patent is extended or adjusted under 35 U.S.C. 154(b) by 47 days.

(21) Appl. No.: 09/922,570

(22) Filed: Aug. 6, 2001

(65) Prior Publication Data

US 2003/0024348 A1 Feb. 6, 2003

(51) Int. Cl.[7] ............................................. F16H 57/02
(52) U.S. Cl. ....................................................... 74/606 R
(58) Field of Search ............................ 74/606 R, 413, 74/421 A; 403/359.1, 359.6

(56) References Cited

U.S. PATENT DOCUMENTS

| | | | | |
|---|---|---|---|---|
| 3,853,416 A | * | 12/1974 | Hanan | 403/322.1 |
| 4,155,275 A | * | 5/1979 | Devanney | 192/223 |
| 4,252,201 A | * | 2/1981 | Dowis | 175/57 |
| 4,254,691 A | * | 3/1981 | Dauvergne | 91/467 |
| 4,369,666 A | * | 1/1983 | Kern | 74/7 R |
| 4,893,292 A | * | 1/1990 | Cleusix | 368/88 |
| 5,207,195 A | * | 5/1993 | McClintic | 123/179.25 |
| 5,584,207 A | * | 12/1996 | Paul et al. | 74/89.22 |
| 5,624,000 A | * | 4/1997 | Miller | 173/216 |
| 5,737,668 A | * | 4/1998 | Hardey et al. | 74/421 A |
| 6,012,985 A | * | 1/2000 | Sukup | 464/37 |

FOREIGN PATENT DOCUMENTS

| | | | |
|---|---|---|---|
| DE | 3310637 A1 | * | 9/1984 |
| JP | 358080146 A | * | 5/1984 |

* cited by examiner

*Primary Examiner*—David A. Bucci
*Assistant Examiner*—Julie K. Smith
(74) *Attorney, Agent, or Firm*—Dallett Hoopes

(57) ABSTRACT

The method includes providing a motor having a drive shaft mounting a pinion profile having an outside diameter and a mounting collar surrounding the shaft, the collar having an outside diameter less than the outside diameter of the gear. A gearbox wall formed with an opening having a generally ring-gear shape larger than the pinion and an inside diameter substantially the same as the outside diameter of the collar. The pinion is maneuvered through the opening and the collar is pressed into the motor-mounting opening. The invention is also the structure of the finished assembly including the opening.

3 Claims, 1 Drawing Sheet

POWER ASSEMBLY AND METHOD OF MAKING SAME

FIELD OF THE INVENTION

This invention relates to a power assembly comprising a small motor and a gear box. The invention also involves the method of assembling a motor in a gear box wall.

BACKGROUND OF THE INVENTION

The secure exact positioning of an electric motor on a gear box wall is essential to assure smooth operation and minimal vibration in the operation of the gear train. For this purpose, small electric motors are often provided with a centering or locating collar surrounding the drive shaft. This collar, usually part of the motor housing, fits snugly into an opening in the gear box and is held in place, usually with additional fasteners, to assure proper engagement of the motor spur with a gear within the gear box.

In the past when the spur has been larger than the opening in the gear box, it has been attached to the shaft after the shaft has been extended through the opening. This has been awkward, has produced problems in securing the spur exactly on the axis and is virtually impossible to accomplish by automatic machinery. Ideally, the spur should be attached to the shaft prior to the assembly of the gear box, but this has not been possible when the spur is larger than the opening.

SUMMARY OF THE INVENTION

The present invention is directed to the structure and the method of assembly when the spur is slightly larger than the opening. The invention involves the method of assembling a motor to a gearbox wall comprising the steps of providing a motor having a drive shaft mounting a spur or pinion formed with a gear profile having an outside diameter, and a mounting collar surrounding the shaft, the collar having an outside diameter less than the outside diameter of the gear. A gearbox wall formed with a motor-mounting opening having a generally ring-gear shape—or in other words, having notches about its periphery—of similar but larger configuration than the spur and an inside diameter substantially the same as the outside diameter of the collar. The spur gear is maneuvered through the motor-mounting opening and the collar is pressed into the inside diameter of the motor-mounting opening. The invention is also the structure of the finished assembly including the notched opening.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
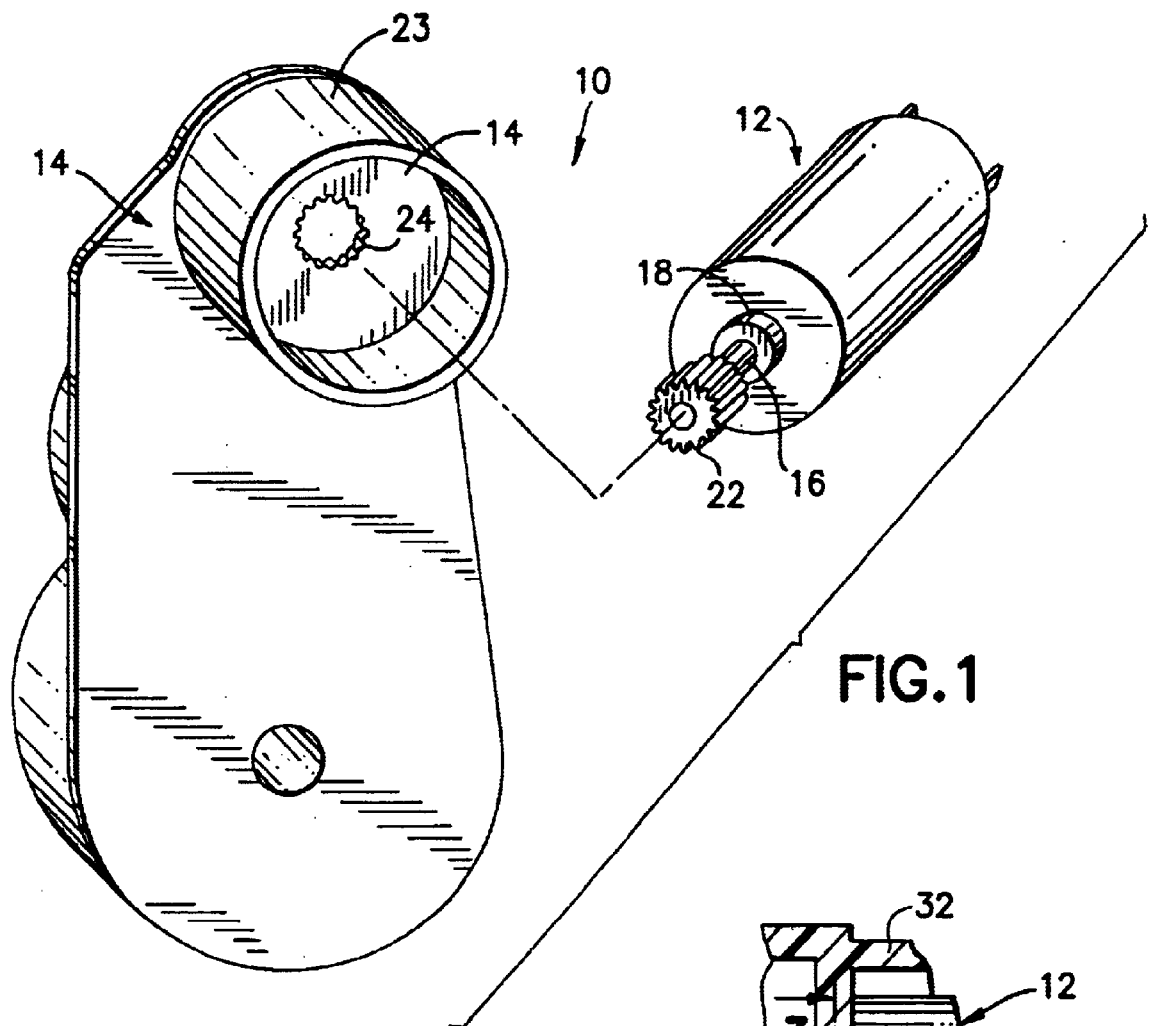
FIG. 1 is a perspective exploded view showing the motor and wall prior to assembly.
Figure 2:
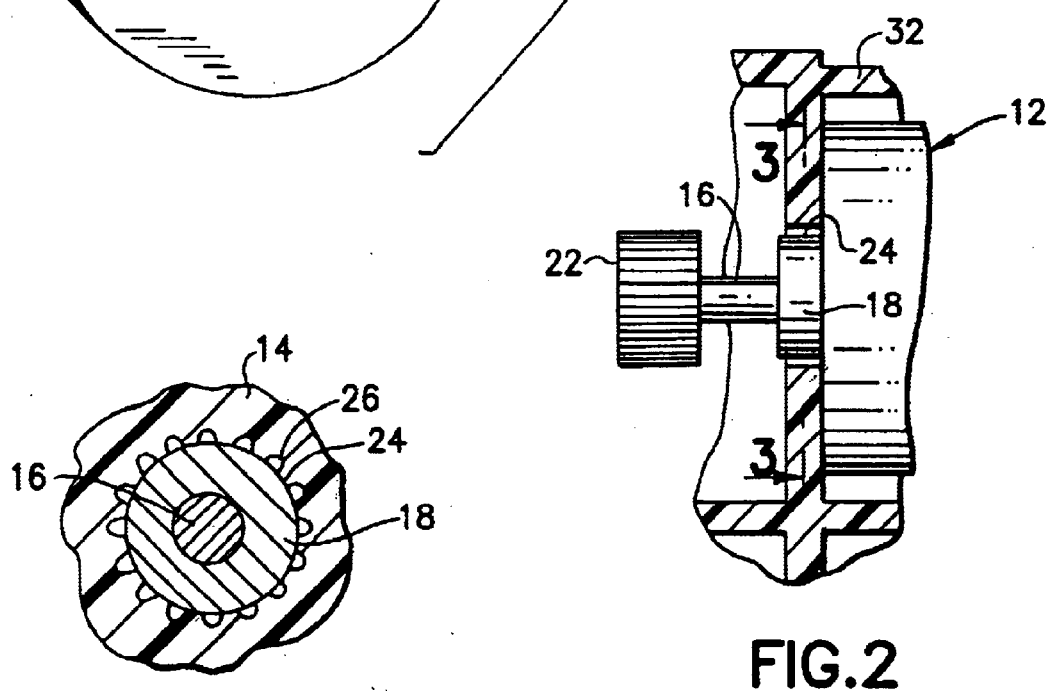
FIG. 2 is an enlarged sectional view on the centerline of the motor.

A power assembly embodying the invention is generally designated 10 in FIG. 1. It comprises a motor 12 and a gear box wall 14.

Figure 3:
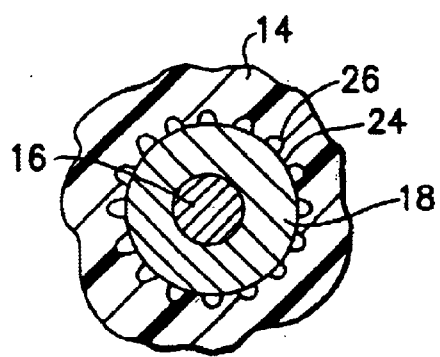
FIG. 3 is a further enlarged sectional view taken on the line 3—3 of FIG. 2.

The motor is formed with a shaft 16 having a surrounding locating collar 18, part of the motor housing. The periphery of the locating collar is concentric with the axis of the shaft 16. The distal end of the shaft 16 is provided with a spur 22 which is to comprise part of a gear train inside the gear box. The gear box wall 14 may be formed with an annular wall 23 and opening 24 which is formed with scallops 26 (FIG. 3) or notches about its periphery. Across the opposite inward peaks of the periphery of the opening the diameter is the same as the diameter of the locating collar 18. However, the shape and spacing of the notches 26 will permit the passage of the spur 22 even though the spur in outside diameter is larger than the diameter of the locating collar.

The opening 24 may be regarded as a form of ring gear or internal gear having teeth which "mesh" with the teeth of the spur gear so that the spur is able to move axially through the opening. It is not important that the teeth of the opening be of the same configuration as the teeth of a mating internal gear, but they must accommodate the passage of the spur.

In assembly, the spur 22 is fixed on the drive shaft 16 and the motor is brought into alignment with the opening, the spur being maneuvered through the opening just as a matching external gear is maneuvered into meshing with a ring gear or internal gear. The annular wall 23 serves as a general guide to the assembly but does not play a part in the exact positioning of the motor: the opening 24 does that.

With the spur inward of the wall and clear of the opening 24, the motor is forced toward the wall, its locating collar 18 snugly fitting into the peaks of the "teeth" of the opening 24.

It should be clear that in the final assembly, the opening forcibly receives the periphery of the locating shoulder, and the spur is entirely on the opposite side of the wall from the motor and presumably meshing with a drive gear. Once the motor is assembled with the gear box wall, the notches 26 between the teeth of the opening play no part in the operation of the motor or spur.

Threaded fasteners may be used to further secure the motor in place on the wall.

There has been thus developed structure and a method for assembling a motor and gear box wall wherein the spur on the end of the motor shaft is larger than the locating collar. This renders unnecessary the awkward assembling the spur onto the shaft while the shaft is already extending through the opening in the wall. The method of the invention greatly facilitates the assembly operation.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A method of assembling a motor to a gearbox wall comprising the steps of:
   a. providing a motor having a drive shaft mounting a gear formed with a toothed profile having an outside diameter, and a mounting collar surrounding the shaft, the collar having an outside diameter less than the outside diameter of the gear,
   b. providing a gearbox wall formed with a motor-mounting opening having an inside diameter formed with a toothed profile similar to but larger than the toothed profile of said gear and inside diameter substantially the same as the outside diameter of the collar,
   c. maneuvering the spur gear through the motor-mounting opening and pressing the collar into the inside diameter of the motor-mounting opening.

2. A method as claimed in claim 1 wherein the opening is circular and has spaced outward notches about its periphery to pass the teeth of the gear.

3. A drive assembly comprising a motor including a shaft mounting a spur gear having teeth and an outside diameter, the shaft having a mounting collar with an outside diameter of lesser diameter than the outside diameter of the spur gear, and a gearbox wall formed with a motor-mounting opening of generally circular shape having an inside diameter and formed with outward notches formed uniformly about its periphery, the notches being larger than the teeth in the spur gear, the shaft and spur gear extending through the opening and the collar snugly fitting into the inside diameter of the opening.

* * * * *